United States Patent [19]

Patino

[11] Patent Number: 5,710,505
[45] Date of Patent: Jan. 20, 1998

[54] BATTERY CHARGING SYSTEM HAVING MULTIPLEXED CHARGING FUNCTIONALITY

[75] Inventor: Joseph Patino, Pembroke Pines, Fla.

[73] Assignee: Motorola, Inc., Schauumburg, Ill.

[21] Appl. No.: 753,832

[22] Filed: Dec. 2, 1996

[51] Int. Cl.⁶ .................................................. H01M 10/46
[52] U.S. Cl. ........................... 320/8; 320/13; 320/30
[58] Field of Search ........................... 320/2, 5, 8, 13, 320/14, 30, 31, 40, 49; 429/90

[56] References Cited

U.S. PATENT DOCUMENTS

| | | | |
|---|---|---|---|
| 4,333,138 | 6/1982 | Huber | 320/1 |
| 4,774,449 | 9/1988 | Elkins | 320/21 |
| 5,006,780 | 4/1991 | Tamura et al. | 320/2 X |
| 5,095,260 | 3/1992 | Whiting | 320/22 |
| 5,410,238 | 4/1995 | Ishizuka et al. | 320/22 |
| 5,471,128 | 11/1995 | Patino et al. | 320/13 |
| 5,576,610 | 11/1996 | Patino et al. | 320/13 |

OTHER PUBLICATIONS

"Triacs, Silicon Bidriectional Triod Thyristors," Motorola Thyristor Device Data, Motorola, Inc., DL137/D, Rev. 4, pp. 3–63 thorugh 3–66, No Date.

*Primary Examiner*—Edward Tso
*Attorney, Agent, or Firm*—Barbara R. Doutre

[57] ABSTRACT

A battery (302) provides both charging and discharging capability with a minimal number of terminals (304, 318, 306). A triac (310) is included within the charge path of the battery (302) to provide both discharge and charge capability. Charging system (300) provides charging and discharging control (332) so that current can be either charged to or drained from the battery (302) through the triac (310). Battery temperature and battery capacity are monitored through a single battery characteristic indicator terminal (318) which also serves as the bias for turning on the triac (310).

8 Claims, 3 Drawing Sheets

BATTERY CHARGING SYSTEM HAVING MULTIPLEXED CHARGING FUNCTIONALITY

TECHNICAL FIELD

This invention relates to batteries and battery charging systems.

BACKGROUND

Referring to FIG. 1 of the accompanying drawings, there is shown a prior art battery charging system 100. The operation of battery charging system 100 is described in issued U.S. Pat. No. 5,471,128 entitled "Battery and Method for Charging/Discharging the Battery" issued to Patino et al. on Nov. 28, 1995 and which is hereby incorporated by reference. Charging system 100 provides both battery charging and battery conditioning capability for a four contact battery 102. Battery conditioning allows a battery to be discharged in a controlled fashion before recharging of the battery occurs. Conditioning a battery provides improved battery performance in terms of cycle life and capacity.

Prior art charging system 100 includes charger 114 and battery 102 interconnected through four mating contacts labeled B+, Rc, Rt, and B−. The charging system 100 can further include a radio 101 coupled to the battery if desired. In this charging system 100, one contact (Rc) 104 is being used to control the charge/discharge path of the battery 102 and to read a capacity element (Rc) 106, also referred to as a battery type indicator. A separate temperature indicator contact (Rt) 108 is used to sense the battery temperature through thermistor 110. A field effect transistor (FET) Q1 112 in the battery 102 is used in the charging path to allow current to charge to and discharge from the battery 102. The Rc contact 104 in system 100 is used to control the FET 110 in the battery 102 in addition to being used to read the battery type through Re element 106. A controlled switch 116 selects one of two regulated supplies, 5 volts or A+ (typically 12 volts). When the 5 volt supply is selected the battery type is determined through the Rc element 106. When the A+ supply is selected the FET 112 is biased on to allow for charging and discharging capability. Thus, battery charging and battery conditioning are provided to a four contact battery 102 in charging system 100.

Referring to FIG. 2, there is shown another prior art battery charging system 200. The operation of battery charging system 200 is described in issued U.S. Pat. No. 5,576,610 entitled "A Method and Apparatus for Determining Battery Characteristics" issued to Patino et al. on Nov. 19, 1996, and which is hereby incorporated by reference. Charging system 200 includes a charger 216 which charges a three contact battery 202 through mating contacts labeled B+, Rt, and B−. The charging system 200 can further include a radio 201 coupled to the battery 202 if desired.

Charger 216 monitors a thermistor element (RT) 206 through the Rt contact 212 to determine the temperature of the battery 202. Charger 216 also monitors a zener diode (Vr1) 208 through the same Rt contact 212 to determine the battery type. Rt contact 212 is coupled to an A/D port 220 of the charger 216. One of two regulated supply voltages, shown as 5 volts and 12 volts, are selectively switched on through switch circuitry 218 so as to provide different voltages to the A/D port 220. When the 5 volt supply is selected the A/D port 220 reads the Rt element 206. When the 12 volt supply is selected, the zener 208 (Vr1) latches and the A/D port 220 determines the battery type. Thus, both battery characteristic indicator elements Rt and Vr1 are read using one contact in a three contact battery. Once the battery type has been determined, charging system 200 allows the thermistor (Rt) 206 to be monitored continuously but does not provide for any battery conditioning capability. However, there is no means of discharging the battery 202 in this three contact charging system.

It would be an desirable to have a battery and charger system capable of providing both charging and discharging capability through a reduced number of contacts. Reducing the number of interconnects required in a charging system while providing both charging and conditioning capability would be an enhancement to the overall charging system in terms of improved mechanical integrity, ease of manufacturing, and lower cost.

DETAILED DESCRIPTION OF THE PREFERRED EMBODIMENT

Figure 1:
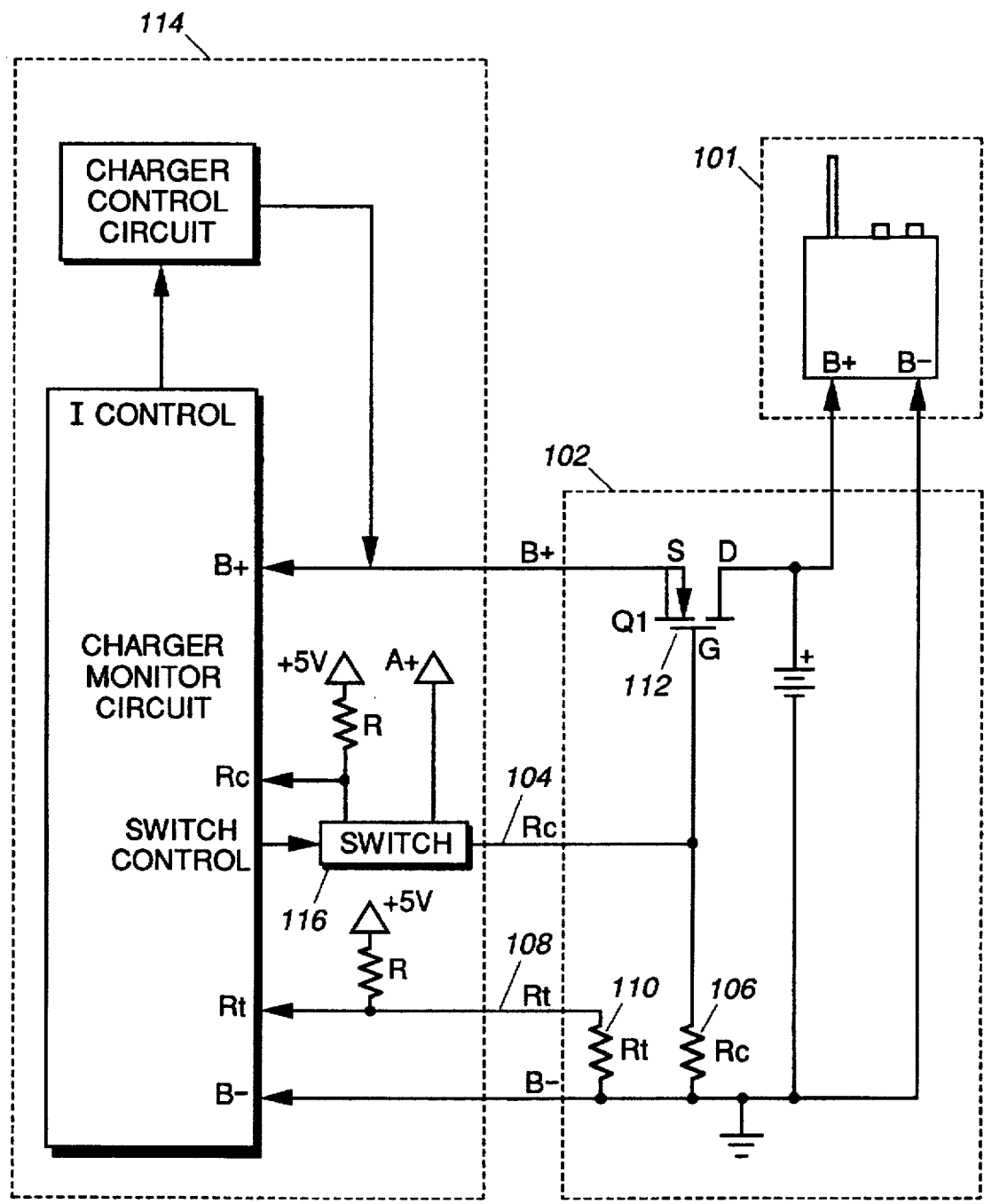
FIG. 1 is a prior art battery charging system.
Figure 2:
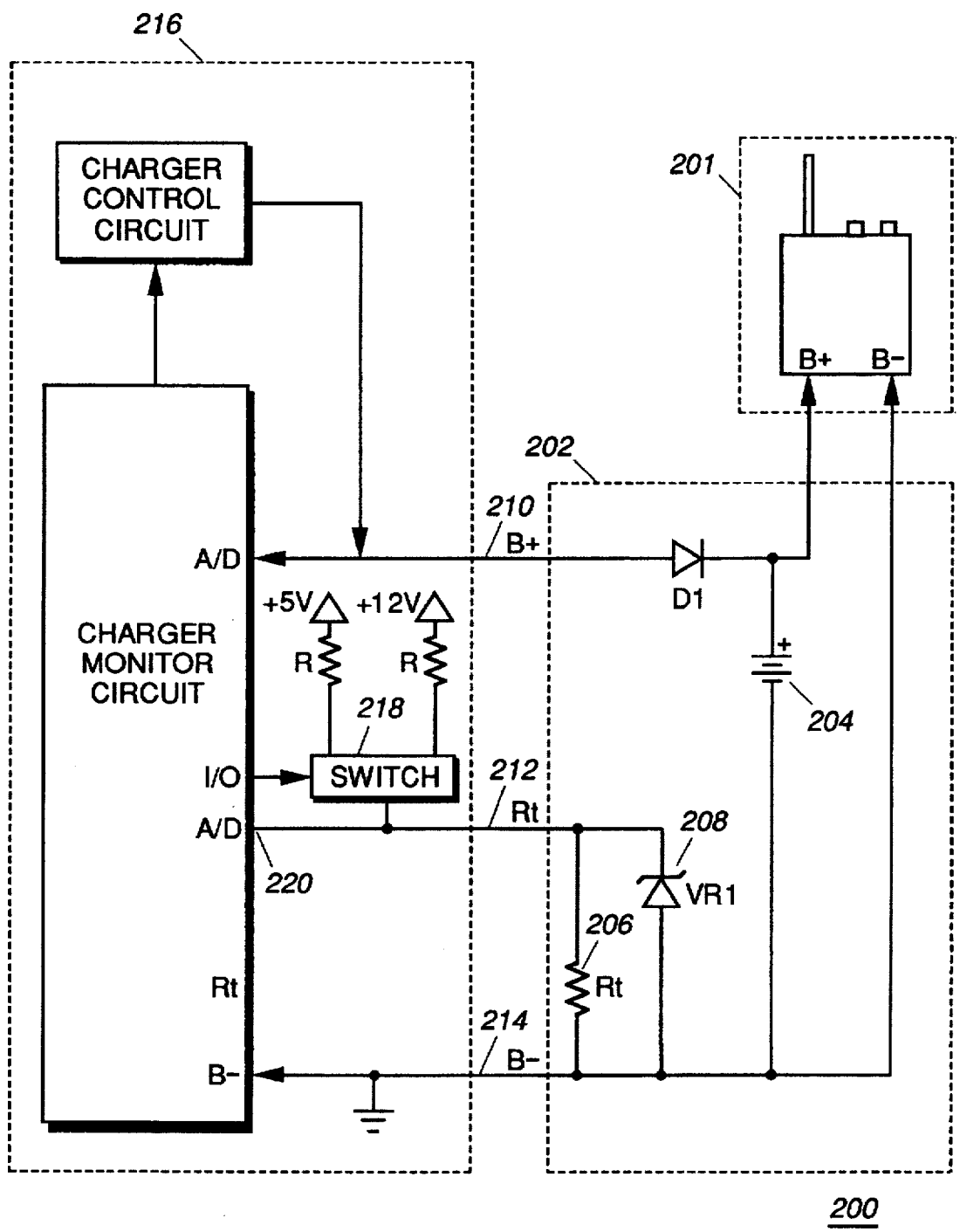
FIG. 2 is a prior art battery charging system.
Figure 3:
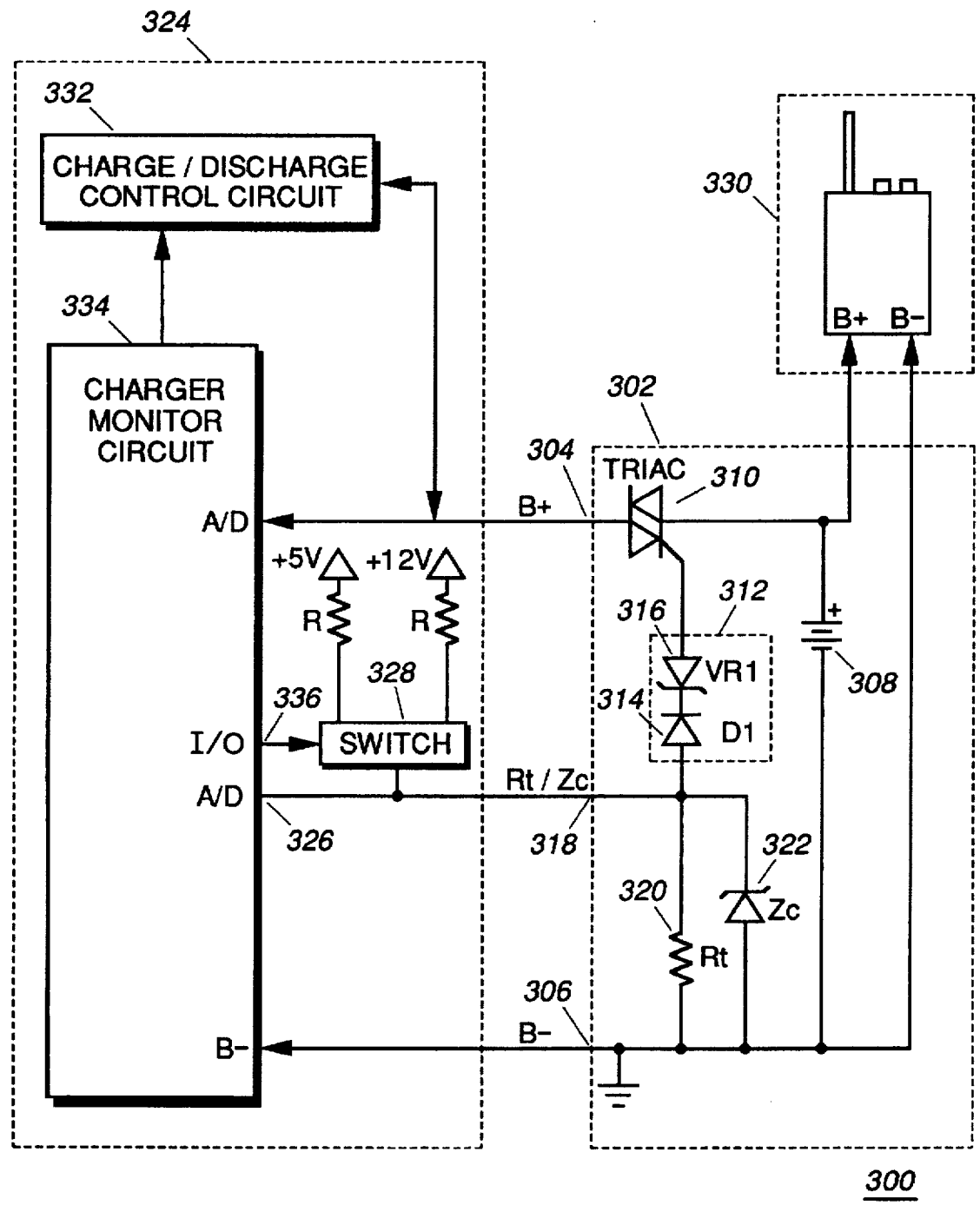
FIG. 3 is a battery and battery charging system in accordance with the present invention.

Referring now to FIG. 3, there is shown a battery charging system 300 in accordance with the present invention. The charging system 300 includes charger 324, battery 302, and radio 330. In accordance with the present invention, a three terminal battery 302 is provided with both charging and discharging capability. Battery 302 includes positive and negative charge terminals 304 and 306 respectively, and battery cells 308 operatively coupled between the positive and negative charge terminals. In accordance with the present invention, battery 302 further includes a bidirectional triode thyristor (triac) 310 for conducting current to and discharging current from the battery cells 308. The triac 310 is a switching device that does not require any control current once it is biased on, and once on allows current to flow through it in either direction. The triac 310 is operatively coupled in the charge path of the battery 302 so as to provide a charge mode of operation and a discharge mode of operation. Biasing circuitry 312, preferably comprised of a switching diode (D1) 314 and a zener diode (Vr1) 316, is operatively coupled to the triac 310 to provide biasing through a battery characteristic indicator terminal (Rt/Rc) 318. The battery characteristic indicator terminal 318 selectively provides first and second bias modes of operation to the triac 310. In the first bias mode of operation the battery characteristic indicator terminal 318 provides battery temperature information, and in the second mode of operation the battery characteristic indicator terminal provides battery capacity information and also biases the triac 310 on.

The battery's biasing circuit 312 is selected so as to provide two bias conditions. One bias condition will turn the triac 310 on while the other bias condition will not turn the triac on. The triac 310, once biased on, will remain on as long as current is flowing through it. This allows the battery characteristic indicator terminal 318 to be used to determine the battery temperature or battery capacity. The battery temperature information is provided by a thermistor 320 while the battery capacity information is provided by a zener diode (Zc) 322.

Charger 824 includes a charger monitor circuit 334 which monitors the battery characteristic indicator terminal 318 through an analog-to-digital converter (A/D) port 326. The charger monitor circuit 384 also provides an input/output (I/O) port 336 which selectively switches, through switch 328, one of two regulated supplies, such as 5 volts and 12 volts, to provide either a first or a second voltage divider to the battery characteristic indicator terminal 318. The lower supply voltage can be switched on to allow the thermistor (Rt) 320 to be read without biasing on the triac 310 or latching the zener (Zc) 322. The battery capacity can then be determined by turning on the larger supply voltage which latches on the diode (Zc) 322 and allows the battery capacity to be read while turning on bias circuitry 312 which in turn switches on the triac 310. Bias circuitry 312 and zener 322 are selected so as to be biased or latched on by the higher supply voltage provided through A/D port 326. The charger 324 can then switch back to the lower supply voltage and monitor the battery temperature continuously through the thermistor 320.

Once the triac 310 is turned on the bias current through the bias circuitry 312 is no longer required. Once current starts to flow through the triac 310, it remains turned on so there is no further need to bias or unbias the triac. The triac 310 will remain on until an interruption occurs in the current flow through the device.

Charge/discharge circuitry 332 is included within the charger 324 to control the charge of current through the charge path of the battery 302 or the discharge of current from the battery. With the triac 310 turned on, either the charging or discharging capability is available to the battery 302. The triac 310 will only need to be rebiased when a new charging or discharging sequence commences. The battery temperature and battery capacity are monitored through A/D port 326 of charger monitor circuit 334. This A/D port 326 also provides the bias control for bias circuitry 312 of the battery 302.

As an example, when the 5 volt supply is switched on through switch 328, the thermistor (Rt) 320 can be read. Then, the 12 volt supply can be switched on and the battery capacity can be read through zener (Zc) 322. The bias circuitry will also switch on with the higher supply and the control circuit 332 can start charging or discharging the battery 302. The triac 310 will remain on until the current flowing through it is interrupted. The charger 324 can switch back to the 5 volt supply and continue to monitor thermistor (Rt) 320 throughout the charging and discharging sequence. The charging system 300 described by the invention provides the advantage of being able to selectively charge or discharge a three terminal battery 302 while continuing to monitor the temperature (Rt).

In accordance with the present invention, the battery charging system 300 allows the charger 324 to be both a charger and a conditioner. Conditioning occurs when the battery 302 is discharged in a predetermined controlled sequence and then recharged. The use of the triac 310 within the charge path of the battery 302 allows a three terminal battery to incorporate both discharge or charge capability. The battery 302 and battery charging system 300 described by the invention provide the advantages of reverse discharge protection, discharge and conditioning, charger lock-out and the multiplexing of three functions on one A/D port, these being the thermistor (Rt) 320, the capacity indicator (Zc) 322, and the triac control 312. One skilled in the art can also appreciate that the triac 310 could also be incorporated into a four contact battery in order to define even more information about the battery characteristics if desired. The three contact scheme described by the present invention provides the advantage of minimal charge terminal with increased capability and functionality. While shown with radio 330 included as part of the system 300, the radio 330 is not required in the charging or discharging of the battery.

Accordingly, there has been provided an improved battery which can be incorporated into a charging system to provide both charging and discharging capability with a minimal number of charging terminals.

What is claimed is:

1. A battery, including:

positive and negative charge terminals;

battery cells operatively coupled between the positive and negative charge terminals;

a triac for conducting current to and discharging current from the battery cells;

biasing circuitry coupled to the triac for biasing the triac on; and a battery characteristic indicator terminal selectively providing first and second bias modes of operation, in the first bias mode of operation the battery characteristic indicator terminal provides battery temperature information, and in the second mode of operation the battery characteristic indicator terminal provides battery capacity information and turns on the biasing circuitry for biasing the triac on.

2. A battery charging system, comprising:

a battery, including:
positive and negative charge terminals;
battery cells operatively coupled between the positive and negative charge terminals;
a triac for conducting current to and discharging current from the battery cells;
biasing circuitry coupled to the triac for biasing the triac on; and
a battery characteristic indicator terminal selectively providing first and second bias modes of operation, in the first bias mode of operation the battery characteristic indicator terminal provides battery temperature information and in the second mode of operation the battery characteristic indicator terminal provides battery capacity information and turns on the biasing circuitry for biasing the triac on; and a charger, including:
positive and negative charging contacts for mating with the positive and negative charge terminals of the battery respectively;
a controller for sensing an A/D port, the A/D port for mating to the battery characteristic indicator terminal and the controller switchably providing first and second voltage levels to the A/D port, the first voltage level providing the first bias mode of operation to the battery characteristic indicator terminal and the second voltage level providing the second bias mode of operation to the battery characteristic indicator terminal;
a charging control circuit for charging the battery through the positive charging terminal; and
a discharging control circuit for discharging the battery through the positive charging terminal.

3. A battery charging system as described in claim 2, wherein the biasing circuitry comprises:

a switching diode; and a zener diode operatively coupled to the switching diode, the zener diode preventing the conduction of current to the triac during the first bias mode of operation and the zener diode allowing the conduction of current to the triac during the second bias mode of operation.

4. A battery, including: a charge path;

a triac coupled in the charge path;

a battery characteristic terminal selectively providing battery temperature information and battery capacity information, said battery characteristic terminal providing bias for the triac when the battery capacity information is selectively provided.

5. The battery of claim 4, wherein the battery is a three terminal battery having positive and negative terminals and the battery characteristic terminal.

6. The battery of claim 5, wherein the triac allows current to be charge to and discharged from the battery.

7. A battery charging system, comprising:

a battery having a charge path;

a triac operatively coupled in the charge path to provide a charge mode and a discharge mode of operation;

biasing circuitry coupled to the triac;

a battery characteristic indicator terminal for selectively providing battery temperature information and battery capacity information, the battery characteristic indicator terminal biasing on the triac and providing the battery capacity information in response to a first voltage level, the battery characteristic indicator terminal providing the battery temperature information in response to a second voltage level; and a charger, including:

- a charging control circuit for coupling to the charge path of the battery;
- a discharge control circuit for coupling to the charge path of the battery;
- an A/D for monitoring the battery characteristic indicator terminal of the battery; and
- a selectable control for switching either the first or second voltage levels onto the A/D port.

8. The battery charging system of claim 7, wherein the A/D port continuously monitors the battery temperature information of the battery through the battery characteristic indicator terminal once the battery capacity information has been determined and the triac has been biased on.

* * * * *